United States Patent
Wernh

(10) Patent No.: US 9,744,597 B2
(45) Date of Patent: Aug. 29, 2017

(54) CUTTING TOOL INSERT AND CUTTING TOOL INSERT HOLDER

(71) Applicant: SANDVIK INTELLECTUAL PROPERTY AB, Sandviken (SE)

(72) Inventor: Stefan Wernh, Sandviken (SE)

(73) Assignee: SANDVIK INTELLECTUAL PROPERTY AB, Sandviken (SE)

(*) Notice: Subject to any disclaimer, the term of this patent is extended or adjusted under 35 U.S.C. 154(b) by 316 days.

(21) Appl. No.: 14/714,704

(22) Filed: May 18, 2015

(65) Prior Publication Data
US 2015/0328689 A1  Nov. 19, 2015

(30) Foreign Application Priority Data
May 19, 2014  (EP) .................................. 14168803

(51) Int. Cl.
*B23B 27/14*  (2006.01)
*B23C 5/22*  (2006.01)
*B23B 27/16*  (2006.01)

(52) U.S. Cl.
CPC ........ *B23B 27/145* (2013.01); *B23B 27/1618* (2013.01); *B23B 27/1622* (2013.01); *B23C 5/2208* (2013.01); *B23B 2200/0423* (2013.01); *B23B 2200/321* (2013.01); *B23B 2200/3681* (2013.01); *B23B 2205/16* (2013.01); *B23B 2250/12* (2013.01); *Y10T 407/2274* (2015.01); *Y10T 407/235* (2015.01)

(58) Field of Classification Search
CPC ........ B23B 2205/16; B23B 2200/0423; B23B 2200/321; B23B 2200/3681; B23B 27/145; B23B 27/1618; B23B 27/1622; B23C 5/2208
See application file for complete search history.

(56) References Cited

U.S. PATENT DOCUMENTS

| | | | | |
|---|---|---|---|---|
| 4,074,949 A * | 2/1978 | Hochmuth | .......... | B23B 27/1614 407/100 |
| 4,294,566 A * | 10/1981 | Boone | ................. | B23B 27/1622 407/104 |
| 6,872,034 B2 * | 3/2005 | Satran | ................... | B23C 5/2213 407/103 |
| 8,282,320 B2 * | 10/2012 | Hartlohner | .......... | B23B 27/1618 407/113 |

(Continued)

FOREIGN PATENT DOCUMENTS

WO  2014033549 A2  3/2014

*Primary Examiner* — Sara Addisu
(74) *Attorney, Agent, or Firm* — Corinne R. Gorski

(57) ABSTRACT

A cutting tool insert includes eight identical cutting edges. Each separate cutting edge has a first cutting edge portion and a second cutting edge portion. A corner angle between the first cutting edge portion and the second cutting edge portion is within a range of 75 to <90 degrees. The first cutting edge portion and the second cutting edge portion have substantially the same length to provide a substantially equal cutting depth. As seen along the center axis of the insert a first angle within a range of 14+/−9 degrees is formed between a first imaginary line extending from the center axis to a corner point at the first side surface and a second imaginary line extending from the center axis to an adjacent corner point at the second side surface. A cutting tool insert holder is also disclosed.

15 Claims, 3 Drawing Sheets

(56) References Cited

U.S. PATENT DOCUMENTS

| | | | |
|---|---|---|---|
| 8,454,277 B2* | 6/2013 | Dudzinsky | B23C 5/006 407/103 |
| 8,454,278 B2* | 6/2013 | Hartlohner | B23B 27/1618 407/113 |
| 2008/0232912 A1* | 9/2008 | Bhagath | B23C 5/06 407/114 |
| 2010/0129166 A1 | 5/2010 | Hartlohner et al. | |
| 2010/0254775 A1* | 10/2010 | Hecht | B23B 27/1622 407/103 |
| 2012/0195700 A1* | 8/2012 | Chen | B23C 5/06 407/40 |
| 2013/0129432 A1* | 5/2013 | Jaeger | B23C 5/207 407/42 |
| 2014/0064864 A1 | 3/2014 | Kaufmann et al. | |
| 2016/0167137 A1* | 6/2016 | Agic | B23B 27/1662 407/66 |

* cited by examiner

CUTTING TOOL INSERT AND CUTTING TOOL INSERT HOLDER

RELATED APPLICATION DATA

This application claims priority under 35 U.S.C. §119 to EP Patent Application No. 14168803.6, filed on May 9, 2014, which the entirety thereof is incorporated herein by reference.

TECHNICAL FIELD

The present disclosure relates to a cutting tool insert to be used in machining of a workpiece. Moreover, the present disclosure relates to a cutting tool insert holder for holding such a cutting tool insert, the cutting tool insert holder being arranged to be used in a machine tool.

BACKGROUND

A cutting tool insert for machining of a workpiece is attached to a cutting tool insert holder, which also may be referred to simply as a tool holder, and is used in a machine tool, such as a lathe, or milling machine. Cutting tool inserts having many different geometries are known. Namely, depending on what kind of cutting operation is to be performed on a workpiece, a relevant cutting tool insert must have a suitable geometry.

A cutting tool insert is commonly provided with two or more cutting edges. Thus, the cutting tool insert may be placed in two or more different positions in a relevant tool holder to expose one of the cutting edges at a time to engage with a relevant workpiece. Put differently, the cutting tool insert is indexable the same number of times as the number of cutting edges.

One example of a cutting tool insert geometry is that having two opposite rhombus side surfaces. Such a cutting tool insert is suited for cutting an inside right angle corner in a turning operation, i.e. remaining material of the workpiece extends at a 270 degree angle about the inside right angle corner. The cutting tool insert includes four cutting edges, i.e. the cutting tool insert is indexable four times. Each cutting edge includes a first cutting edge portion and a second cutting edge portion arranged at an acute angle. The first cutting edge portion may cut a workpiece along a first direction and the second cutting edge portion may cut the workpiece along a direction orthogonal to the first direction. A cutting tool insert coded CNMG is an example of one such cutting tool insert having two rhombus surfaces.

An eight times indexable cutting tool insert can also cut an inside right angle corner similarly as a cutting tool insert having two rhombus side surfaces. An example of an eight times indexable cutting tool insert is taught by US 2014/0064864.

SUMMARY

It is an object of the present disclosure to provide an improved eight times indexable cutting tool insert, which provides the possibility of cutting an inside right angle corner in a workpiece.

According to an aspect of the disclosure, the object is achieved by a cutting tool insert, comprising a body having a first side surface, a substantially identical second side surface extending in parallel with the first side surface, and four mutually substantially identical lateral surfaces extending between the first and second side surfaces. The cutting tool insert includes eight separate cutting edges, the separate cutting edges being identical and each separate cutting edge having a first cutting edge portion and a second cutting edge portion interconnected by a corner edge. The first cutting edge portion extends along a rim portion at an intersection between one of the first and second side surfaces and one of the lateral surfaces and the second cutting edge portion extends along a rim portion at an intersection between two of the lateral surfaces along a direction from the corner edge towards an imaginary middle plane extending between and in parallel with the first and second side surfaces.

Seen in a side view along a center axis extending perpendicularly to the first and second side surfaces, the cutting tool insert includes a corner point at each of the corner edges, four of the corner points being symmetrically arranged at each of the first side surface and the second side surface with equal diagonal distances between the corner points. A corner angle between the first cutting edge portion and the second cutting edge portion is within a range of 75 to <90 degrees. The first cutting edge portion and the second cutting edge portion have substantially the same length to provide a substantially equal cutting depth along each of two orthogonal cutting directions. Seen along the center axis a first angle within a range of 14+/−9 degrees is formed between a first imaginary line extending from the center axis to one of the corner points at the first side surface and a second imaginary line extending from the center axis to an adjacent corner point of the corner points at the second side surface.

Since the cutting tool insert is provided with eight identical cutting edges arranged four at each of the first and second side surfaces and the corner angle of each cutting edge is within a range of 75 to <90 degrees, the first and second cutting edge portions have substantially the same length, and the first angle is within a range of 14+/−9 degrees, the an inside right angle corner may be cut in a workpiece by means of the cutting tool insert. As a result, the above mentioned object is achieved.

Within the mentioned range of 75 to <90 degrees of the corner angle a strong cutting edge may be provided. If the angle is larger than 90 degrees, it is not possible to cut an inside right angle corner. If the angle is smaller than 75 degrees, the cutting edge may be more delicate and it may be difficult to provide a corresponding geometry of the cutting tool insert to provide an eight times indexable cutting tool insert. In some preferred embodiments, the corner angle may be within a range of 78-82 degrees. In this manner a relief angle of 4-6 degrees between each of the first and second cutting edge portions and a workpiece may be provided when cutting an inside right angle corner in the workpiece. Thus, chips will not be caught between the cutting tool insert and the workpiece, which otherwise might destroy the cutting tool insert.

Within the range of the first angle of 14+/−9 degrees a suitable relief between the cutting tool insert and a workpiece may be provided along an extension of the second cutting edge portion beyond the second cutting edge portion towards the second side surface. In some preferred embodiments, the first angle may be within the range of 15-19 degrees. In this manner, seen from a cutting edge at the first side surface engaging with a workpiece, two adjacent cutting edges and their corresponding corner portions of the cutting tool insert at the second side surface may be arranged substantially within the same distance from the workpiece such that none of them interfere with the workpiece.

The cutting tool insert may be manufactured from a material comprising one or more of cemented carbide, ceramics, cubic boron nitride, diamond, and cermet. The cutting tool insert may be arranged to be held in a tool holder.

According to the embodiments, the cutting tool insert may have a ratio of within a range of 0.7:1 to 1.1:1 between a distance extending between the first and second side surfaces along the center axis and a distance extending between two adjacent corner points of the first side surface. In this manner the cutting tool insert may be shaped to provide second cutting edge portions of substantially the same length as the first cutting edge portions. Moreover, with the ratio within the above mentioned range, the cutting tool insert may be used in a left hand cutting tool insert holder, as well as in a right hand cutting tool insert holder, and in both left hand and right hand cutting tool insert holders provide the substantially equal cutting depth along each of two orthogonal cutting directions. That is, there is no requirement to provide mirror-image versions of the cutting tool insert for left hand and right hand cutting tool insert holders, which is necessary in the prior art cutting tool insert mentioned above.

According to the embodiments, the body may include a through hole extending along the center axis. In this manner the cutting tool insert may be secured to a relevant tool holder by a clamping device of the tool holder extending through, or into, the through hole. According to embodiments, seen in a side view along the center axis, a second angle within a range of 5 to 20 degrees may be formed between a third imaginary line extending from a first corner point to an adjacent second corner point at the first side surface and a relief face of a second cutting edge portion related to the first corner point. In this manner a relief angle of the second cutting edge portion of approximately 6 degrees, when the cutting tool insert is held in a relevant tool holder, may be provided in the cutting tool insert with the first angle within the range of 14+/−9 degrees. The approximate 6 degrees relief angle may be a suitable compromise between cutting edge strength and clearance between the cutting edge and the workpiece.

Another advantage with the second angle within a range of 5-20 degrees may reveal itself when a relief face of the second cutting edge portion forms an abutment surface for transferring tangential cutting forces to a relevant cutting tool insert holds, as described further below. Thus, the relief face may be arranged approximately perpendicularly to the tangential cutting force produced at an adjacent cutting edge engaging with a workpiece, to withstand the tangential cutting substantially without producing lateral forces affecting the insert. According to some preferred embodiments, the second angle may be within a range of 13-17 degrees. In this manner the above advantages may be achieved in a cutting tool insert according to the above mentioned preferred embodiments with the first angle within the range of 15-19 degrees According to the embodiments, seen in a side view along the center axis a third angle having a size within a range of a size of the second angle +0 to +10 degrees may be formed between the third imaginary line and a fourth imaginary line extending along a tip portion of the first cutting edge portion at the adjacent second corner point. In this manner a suitable inclination angle for the first cutting edge portion may be provided when the cutting tool insert is held in a relevant cutting tool insert holder. Moreover, the inclination angle may be provided in the cutting tool insert with the first angle within the range of 14+/−9 degrees. Within the range a suitably sized positive, as well as negative, inclination angle may be provided for the first cutting edge portion. When the cutting tool insert is held in a relevant cutting tool insert holder and the third angle is approximately the size of the second angle +6 degrees, the inclination angle may be approximately neutral leaning to the positive side of neutral. Consequently, when the third angle is smaller and approaches the same size as the second angle, the inclination angle is negative, and when the third angle is more than 6 degrees, up to 10 degrees, larger than the second angle, the inclination angle is positive. The third angle having a size within a range of a size of the second angle +0 to +10 degrees entails that the size of the third angle ranges from the same size as the second angle up to a size of 10 degrees larger than the second angle.

According to the embodiments, a transition between one of the second cutting edge portions at the first side surface and an adjacent of the second cutting edge portions at the second side surface may be formed by a continuous interconnecting edge extending between the two second cutting edge portions. In this manner a smooth transition may be provided between two adjacent second cutting edge portions at the first and second side surfaces.

According to the embodiments, the continuous interconnecting edge may cross the imaginary middle plane at an angle other than a right angle. In this manner an inclined surface may be provided in a transition between a rake face of the cutting edge comprising the second cutting edge at the first side surface and a relief face of the adjacent second cutting edge at the second side surface. Thus, the relief face of the adjacent second cutting edge at the second side surface may be protected from wear by the inclined surface when the relevant cutting edge at the first side surface is in cutting engagement with a workpiece and produces chips directed towards the inclined surface instead of directly onto the relief face of the adjacent second cutting edge at the second side surface.

According to the embodiments, the cutting tool may have a ridge forming a first chip breaker at the first cutting edge portion and a second chip breaker at the second cutting edge portion, wherein the ridge extends substantially along a bisector of the cutting angle. In this manner a substantially symmetrical chip breaker may be provided on the rake face. Thus, substantially similar cutting properties may be provided along the first and second cutting edge portions. According to the embodiments, the cutting tool insert may be a turning tool insert.

According to a further aspect of the disclosure there is provided a cutting tool insert holder including a tool holder body provided with a recess. The cutting tool insert holder further includes a shim arranged at a bottom portion of the recess, and a clamping device for clamping a cutting tool insert according to any one of the preceding claims in the recess against the shim.

According to the embodiments, the cutting tool insert holder may include a cutting tool insert according to any aspect or embodiment disclosed herein.

Further features of, and advantages with, the present disclosure will become apparent when studying the appended claims and the following detailed description.

BRIEF DESCRIPTION OF THE DRAWINGS

Various aspects of the disclosure, including its particular features and advantages, will be readily understood from the example embodiments discussed in the following detailed description and the accompanying drawings, in which.

DETAILED DESCRIPTION

Aspects of the present disclosure will now be described more fully. Like numbers refer to like elements throughout. Well-known functions or constructions will not necessarily be described in detail for the sake of brevity and/or clarity.

Figure 1:
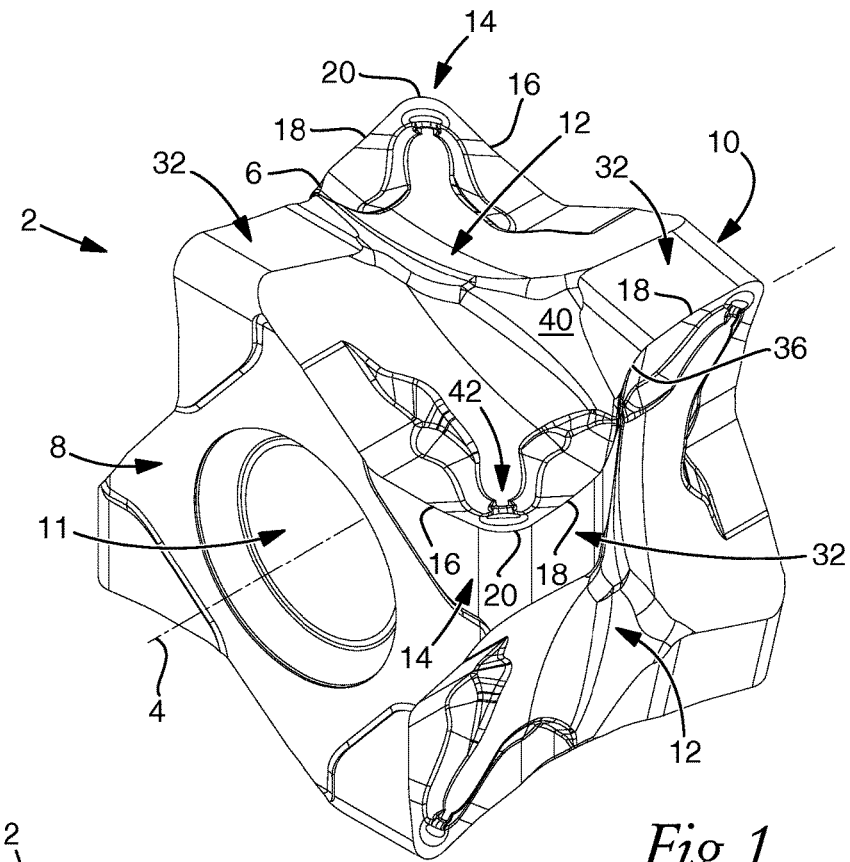
FIG. 1 is a perspective views of a cutting tool insert according to the present disclosure.
Figure 2:
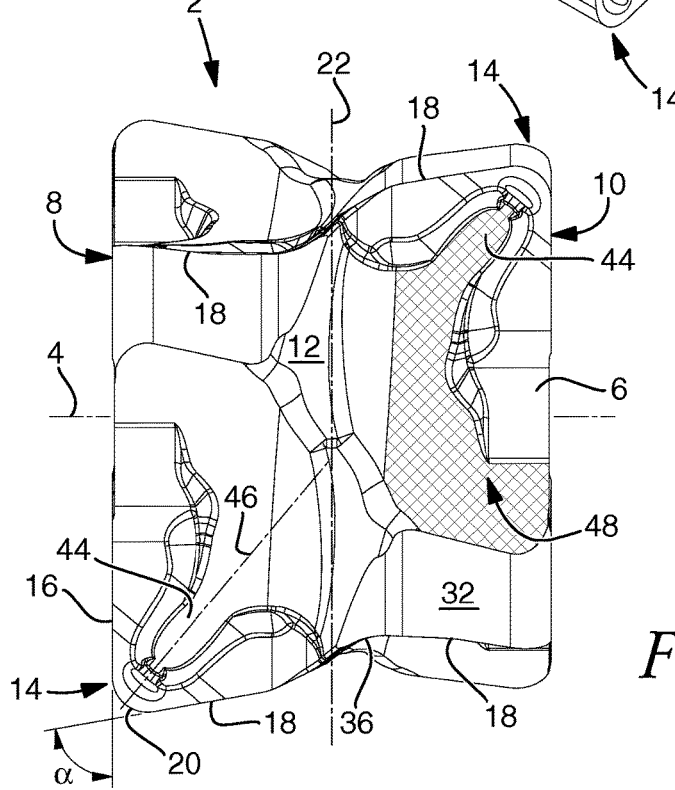
FIG. 2 is a cross-sectional view of the insert of FIG. 1.
Figure 3:
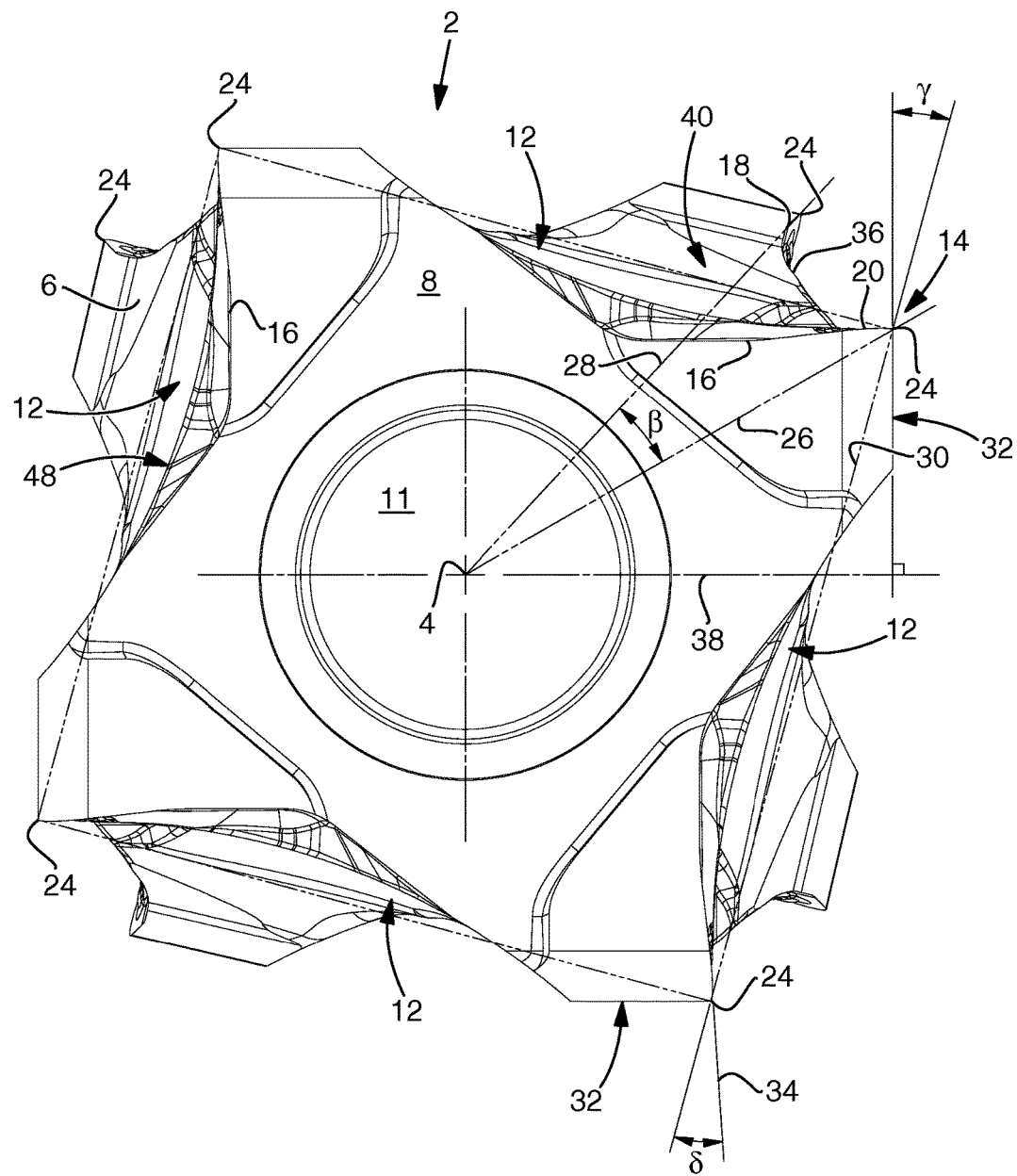
FIG. 3 is a front view of the insert of FIG. 1.

FIGS. 1-3 illustrate a cutting tool insert 2 according to the embodiments. FIG. 1 illustrates the cutting tool insert 2 in a perspective view, FIG. 2 illustrates the cutting tool insert 2 in a side view perpendicular to a center axis 4 of the cutting tool insert 2, and FIG. 3 illustrates the cutting tool insert 2 in a side view along the center axis 4. The cutting tool insert 2 may be a turning tool insert.

The cutting tool insert 2 includes a body 6 having a first side surface 8, and an identical second side surface 10 opposite to the first side surface 8. The second side surface 10 extends in parallel with the first side surface 8. The center axis 4 extends perpendicularly to the first and second side surfaces 8, 10. The body 6 further has four substantially identical lateral surfaces 12 extending between the first and second side surfaces 8, 10. Whereas the first and second side surfaces 8, 10 are substantially flat over large portions thereof, each lateral surface 12, seen as a whole, is an uneven surface.

The body 6 has a through hole 11 extending along the center axis 4. The cutting tool insert includes eight separate cutting edges 14. The separate cutting edges 14 are identical and each has a first cutting edge portion 16 and a second cutting edge portion 18 interconnected by a corner edge 20. The corner edge 20 may form a circular arc extending between the first cutting edge portion 16 and the second cutting edge portion 18. Alternatively, the corner edge 20 may form a curve having more than one radius.

It should be appreciated that only some of the eight cutting edges 14, their first and second cutting edge portions 16, 18 and corner edges 20, are indicated with reference numerals in FIGS. 1-3. The eight cutting edges 14 are located symmetrically at corner portions of the body 6, and since the eight cutting edges 14 and the respective corner portions are identical, their different details are also clearly shown at cutting edges and corner portions shown in FIGS. 1-3 which are not provided with reference numerals. The same is valid also for other details of the cutting tool insert 2.

The first cutting edge portion 16 extends along an intersection between a rake face of the cutting edge 14 and a relief face of the first cutting edge portion 16 provided by the first and second side surfaces 8, 10, respectively. The second cutting edge portion 18 extends along an intersection between the rake face of the cutting edge 14 and a relief face of the second cutting edge portion 18 provided by one of the lateral surfaces 12.

The first cutting edge portion 16 extends along a rim portion at an intersection between one of the first and second side surfaces 8, 10 and one of the lateral surfaces 12. Thus, at the first side surface 8, the first cutting edge portion 16 of a relevant cutting edge 14 extends along a rim portion of the first side surface 8. Similarly, at the opposite second side surface 10 the first cutting edge portion 16 of a relevant cutting edge 14 extends along a rim portion of the second side surface 10. Put differently, the first cutting edge portion 16 extends along an intersection between the first side surface 8 and a relevant of the lateral surfaces 12, respectively along an intersection between the second side surface 10 and a relevant lateral surface 12.

The second cutting edge portion 18 extends along a rim portion at an intersection between two of the lateral surfaces 12. Each of the second cutting edge portions 18 extends along a direction from its respective corner edge 20 towards an imaginary middle plane 22, see FIG. 2. The imaginary middle plane 22 extends at the middle of the cutting tool insert 2 between the first and second side surfaces 8, 10 and in parallel with the first and second side surfaces 8, 10.

As seen in the side in FIG. 3, the cutting tool insert includes a corner point 24 at each of the corner edges 20. Each corner point 24 forms an outermost point of each cutting edge 14, as seen in the side view along the center axis 4. In, e.g. a perspective view the corner points 24 may not be clearly distinguishable due to the arc-shaped corner edges 20 and a smooth transition between the corner edges 20 and their respective first and second cutting edge portions 16, 18. At each of the first and second side surfaces 8, 10, four of the corner points 24 are symmetrically arranged. This entails that the diagonal distance between the corner points 24 at each of the first and second side surfaces 8, 10 is the same. Put differently, the four corner points 24 at each of the first and second side surfaces 8, 10 are arranged in a square, as indicated by broken lines in FIG. 3.

A corner angle α between the first cutting edge portion 16 and the second cutting edge portion 18 is within a range of 75 to <90 degrees. In these illustrations, the first and second cutting edge portions 16, 18 are straight, seen in a view from above a relevant cutting edge 14. If the first and/or second cutting edge portions are curved, the corner angle α is measured between tangents of the first and/or second cutting edge portions. In this manner a first prerequisite for cutting an inside right angle corner with the cutting tool insert 2 is fulfilled. Moreover, the first cutting edge portion 16 and the second cutting edge portion 18 have substantially the same length. Thus, a substantially equal cutting depth along each of two orthogonal cutting directions may be provided by each cutting edge 14, and a second prerequisite for cutting an inside right angle corner with the cutting tool insert 2 is fulfilled.

Depending on the embodiment, lengths of the cutting edge portions 16, 18 may be defined in a suitable manner. For instance, a length of the first and second cutting edge portions 16, 18 may be defined inter alia by ground portions of the first and second side surfaces 8, 10 and ground portions of the lateral surfaces 12. Another example of defining a length of the first and second cutting edge portions 16, 18 may be from an intersection between lines extending along the first and second cutting edge portions 16, 18 to a distinct direction change of a rim portion of the body 6. Alternatively, the length may be defined from an end of the arc forming the corner edge 20. A further definition of the length of the first and second cutting edge portions 16, 18 may be the portion of a cutting edge portion, along which a relevant chip breaker extends.

According to the embodiments, the first cutting edge portion 16 and the second cutting edge portion 18 each may be adapted to provide a cutting depth of at least 4 mm along each of two orthogonal cutting directions.

Further, as seen along the center axis 4, a first angle β within a range of 14+/−9 degrees is formed between a first imaginary line 26 extending from the center axis 4 to one of the corner points 24 at the first side surface 8 and a second imaginary line 28 extending from the center axis 4 to an adjacent corner point 24 of the corner points 24 at the second side surface 10. In this manner the cutting edges 14 at the first side surface 8 are offset from the cutting edges 14 at the second side surface about the center axis 4 by an amount corresponding to the first angle β. Thus, the second cutting edge portions 18 of the cutting edges 14 at both the first and second side surfaces 8, 10 may provide a cutting depth along their full lengths. In the illustrated embodiments the first angle β is approximately 17 degrees.

The cutting tool insert 2 has a ratio of approximately 1:1 between a distance extending between the first and second side surfaces 8, 10 along the center axis 4 and a distance extending between two adjacent corner points 24 of the first side surface 8. As previously mentioned, the cutting tool insert 2 thus may be shaped to provide second cutting edge portions 18 of substantially the same length as the first cutting edge portions 18 and the cutting tool insert 2 may be used in both right hand and left hand tool holders. Moreover, this is not only the case with the illustrate ratio, but also with a cutting tool insert 2 having a ratio of within a range of 0.7:1 to 1.1:1. Mentioned purely as an example, the distance between the first and second side surfaces 8, 10 along the center axis 4 may be 10 mm and the distance between two adjacent corner points 24 may be 11 mm.

Seen in a side view along the center axis 4, i.e. as in the view illustrated in FIG. 3, a second angle γ within a range of 5 to 20 degrees may be formed between a third imaginary line 30 extending from a first corner point 24 to an adjacent second corner point 24 at the first side surface 8 and a relief face 32 of a second cutting edge portion 18 related to the first corner point 24, see also FIG. 1. Seen in the same side view a third angle 6 is formed between the third imaginary line 30 and a fourth imaginary line 34 extending along a tip portion of the first cutting edge portion 16 at the adjacent second corner point 24. The fourth imaginary line 34 extending along the tip portion of the first cutting edge portion 16 extends from the relevant corner point 24 along the corner edge 20 and along at least a portion of the first cutting edge portion 16. In some embodiments, the fourth imaginary line 34 may extend along the entire first cutting edge portion 16. Further, the third angle 6 may be within a range of a size of the second angle γ up to +10 degrees. In this manner a positive, neutral, or slightly negative inclination angle may be provided at a relevant first cutting edge portion 16 when the cutting tool insert 2 is held in a tool holder. Thus, e.g. at the end points of the range of the second angle γ, the third angle 6 is within the range of 5-15 degrees and at the opposite end of the range of the second angle γ, the third angle 6 is within the range of 20-30 degrees. Further, due to the provision of the third angle 6 as defined above, a coolant outlet may be provided in a relevant tool holder at the adjacent second corner point 24 when the first corner point 24 is arranged in the tool holder for cutting engagement with a work piece, see below with reference to FIG. 2.

A transition between one of the second cutting edge portions 18 at the first side surface 8 and an adjacent of the second cutting edge portions 18 at the second side surface 10 is formed by a continuous interconnecting edge 36 extending between the two second cutting edge portions 18, 18. The continuous interconnecting edge 36 crosses the imaginary middle plane 22 at an angle other than a right angle, see FIG. 2.

An imaginary further plane 38 extends along the center axis 4 and at a right angle to a relief face 32 of the said one of the second cutting edge portions 18 at the first side surface 8, wherein seen along the imaginary further plane 38 the continuous interconnecting edge 36 extends away from the imaginary further plane 38, and wherein seen in parallel with the imaginary further plane 38 the continuous edge extends towards the center axis 4, see FIG. 3 and FIG. 2. In the latter figure, the further imaginary plane 38 extends in parallel with the plane of the figure.

Due to the above discussed arrangement of the two second cutting edge portions 18, 18 at the first and second side surfaces 8, 10 and the continuous interconnecting edge 36, an inclined surface 40 is provided in a transition between a rake face 42 of the cutting edge 14 including the second cutting edge 18 at the first side surface 8 and a relief face 32 of the adjacent second cutting edge 18 at the second side surface 10, see FIG. 1.

The cutting tool insert 2 includes a ridge 44 on the rake face 42, the ridge 44 forming a first chip breaker at the first cutting edge portion 16 and a second chip breaker at the second cutting edge portion 18. The ridge 44 extends substantially along a bisector 46 of the corner angle α.

The relief face 32 of the second cutting edge portion 18 is arranged to form a first abutment surface for transferring at least part of a tangential cutting force from an adjacent engaging cutting edge 14 to a supporting surface of a relevant cutting tool insert holder. See FIG. 3, wherein the upper right cutting edge 14 may be seen as the adjacent cutting edge 14 engaging with a workpiece and the relief face 32 at the lower right corner point 24 forms the first abutment surface. See also below with reference to FIG. 2.

The cutting tool insert 2 has a substantially concave surface portion 48 extending substantially in parallel with the center axis 4 and from the relief face 32 of the second cutting edge portion 18 towards an adjacent cutting edge 14. At least a portion of the substantially concave surface 48 forms a second abutment surface for transferring at least part of a cutting force from an opposite cutting edge 14 to a supporting surface of a relevant cutting tool insert holder. The concave surface portion 48 has been indicated with hatching in FIG. 2. Again, seen in FIG. 3, the upper right cutting edge 14 may be seen as a cutting edge 14 engaging with a workpiece and the concave surface portion 48 at the left hand lateral surface 12 forms the second abutment surface. See also below with reference to FIG. 2. The substantially concave surface portion 48 extends at least along a portion of the ridge 44, as is clearly shown in FIG. 2.

It may be noted that the two relief faces 32 of respective second cutting edge portions 18 and two concave surface portions 48 form part of one lateral surface 12. The two relief faces 32 are arranged at diagonally opposite corner portions of the lateral surface 12. At each of the other two diagonally opposite corner portions of the lateral surface 12, there is arranged a rake face of a cutting edge 14. At the lateral surface 12, in a transitional area between each relief face 32 and the rake face of a cutting edge 14 adjacent thereto, the inclined surface 40 is arranged.

Figure 4:
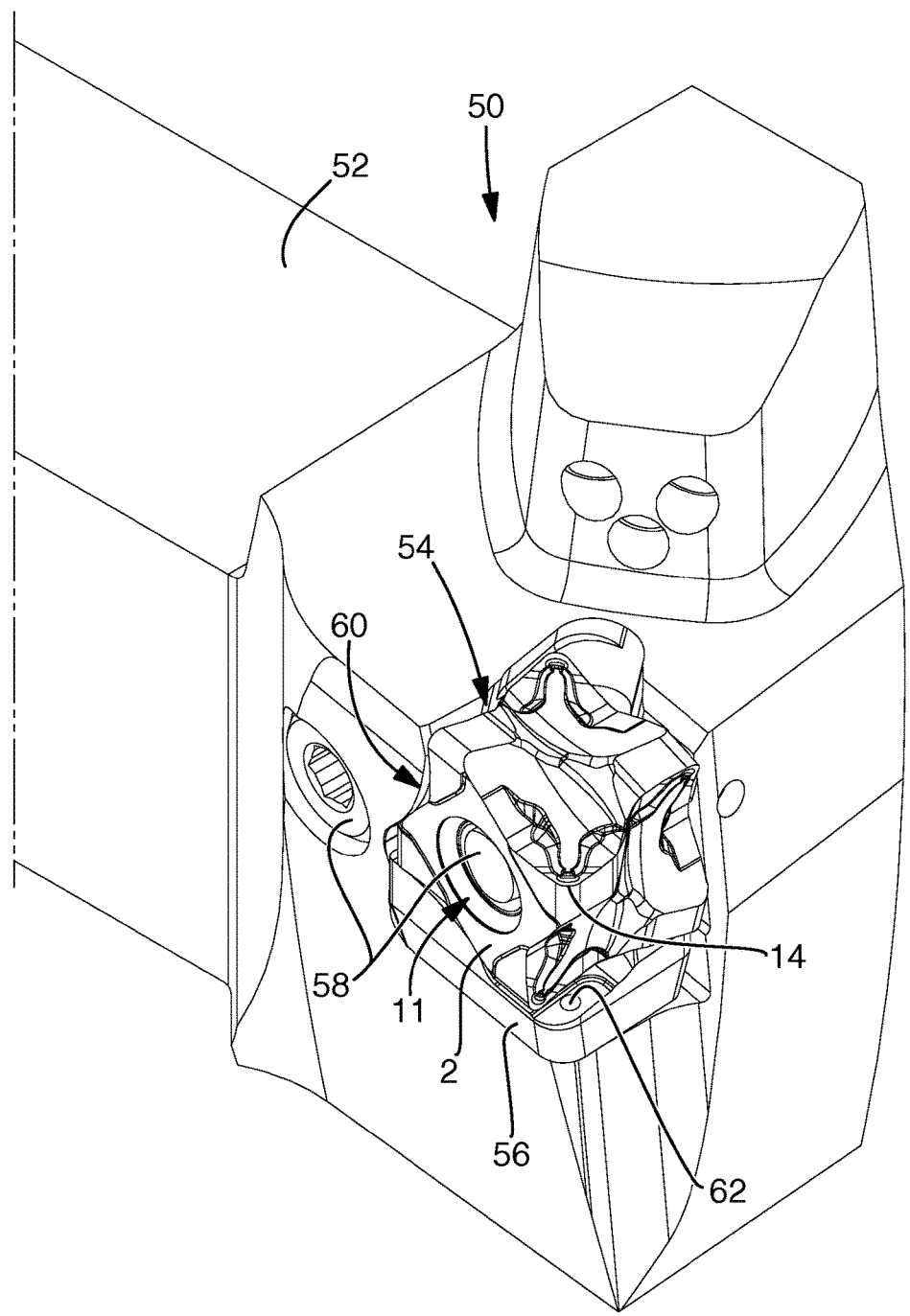
FIG. 4 is a perspective view a cutting tool insert holder with a cutting insert of the present disclosure.

FIG. 4 illustrates a cutting tool insert holder 50 according to the embodiments. The cutting tool insert holder 50 is adapted to be used in a lathe for use in a turning operation. The cutting tool insert holder 50 includes a tool holder body 52. The tool holder body 52 is provided with a recess 54. The cutting tool insert holder 50 further includes a shim 56 arranged at a bottom portion of the recess 54, and a clamping device 58 for clamping a cutting tool insert 2 against the shim 56. The cutting tool insert 2 may be a cutting tool insert according to any aspect or embodiment disclosed herein. Herein, a cutting tool insert holder may alternatively be referred to as a tool holder.

A portion of the clamping device 58 extends into the through hole 11 of the cutting tool insert 2 and provides a clamping force along tangential, radial, and axial directions inwardly into the recess 54. The tangential, radial, and axial directions are cutting directions as seen along a workpiece (not shown), with which a cutting edge 14 engages. Depending on whether the cutting tool insert 2 is used in a right hand or a left hand cutting tool insert holder, and whether the cutting tool insert holder extends perpendicularly or axially to a relevant workpiece, the radial and axial directions may differ. In the following description relating to FIG. 4 reference is made to the illustrated left hand cutting tool insert holder as extending perpendicularly to a workpiece.

The cutting tool insert 2 is eight times indexable in the recess 54. One of the eight cutting edges 14 of the cutting tool insert 2 protrudes one at a time from the recess to engage with a workpiece. As discussed above, a relief face 32 of the second cutting edge portion 18 of the cutting edge 14 close to the shim 56 below the engaging cutting edge 14 abuts against the shim 56, see also FIGS. 1-3. Thus, the relief face of the first cutting edge seen clockwise from an engaging cutting edge 14, abuts against the shim 56 and is arranged to form a first abutment surface for transferring at least part of a tangential cutting force from the engaging cutting edge 14 to a supporting surface of a relevant cutting tool insert holder, a portion of the shim 56 forming the supporting surface.

Also as discussed above, the substantially concave surface portion 48 of the cutting tool insert 2 forms an abutment surface for transferring at least part of a cutting force from the engaging cutting edge 14 to a supporting surface of the cutting tool insert holder 50. That is, in these embodiments a radial cutting force is at least partially transferred to a supporting surface in the recess 54 opposite to the engaging cutting edge 14, as indicated at 60 in FIG. 4, see also FIGS. 1-3.

The third angle $\delta$, discussed above with reference to FIG. 3, permits the cutting tool insert 2 to be positioned in the cutting tool insert holder 50 with an area of the shim 56 extending outside the cutting tool insert 2, without the shim 56 engaging with a relevant workpiece. An outlet 62 for coolant is provided in the said area of the shim 56. Thus, coolant may be supplied to a cutting zone of a workpiece from a direction of the relief faces of the engaging cutting edge 14.

This disclosure should not be construed as limited to the embodiments set forth herein. A person skilled in the art will realize that different features of the embodiments disclosed herein may be combined to create embodiments other than those described herein, without departing from the scope of the present disclosure, as defined by the appended claims.

Although the disclosure has been described with reference to example embodiments, many different alterations, modifications and the like will become apparent for those skilled in the art. Therefore, it is to be understood that the foregoing is illustrative of various example embodiments and that the disclosure is defined only by the appended claims.

As used herein, the term "comprising" or "comprises" is open-ended, and includes one or more stated features, elements, steps, components or functions but does not preclude the presence or addition of one or more other features, elements, steps, components, functions or groups thereof.

The invention claimed is:

1. A cutting tool insert, comprising
   a body having a first side surface, a second side surface extending in parallel with and being substantially identical to the first side surface, and four mutually substantially identical lateral surfaces extending between the first and second side surfaces;
   eight separate cutting edges, the separate cutting edges being identical and each separate cutting edge including a first cutting edge portion and a second cutting edge portion interconnected together by a corner edge, wherein the first cutting edge portion extends along a rim portion at an intersection between one of the first and second side surfaces and one of the lateral surfaces and the second cutting edge portion extends along a rim portion at an intersection between two of the lateral surfaces along a direction from the corner edge towards an imaginary middle plane extending between and in parallel with the first and second side surfaces;
   a plurality of corner points, a corner point being at each of the corner edges as seen in a side view along a center axis of the insert extending perpendicularly to the first and second side surfaces, four of the corner points being symmetrically arranged at each of the first side surface and the second side surface with equal diagonal distances between the corner points;
   a corner angle ($\alpha$) between the first cutting edge portion and the second cutting edge portion is within a range of 75 to <90 degrees, wherein the first cutting edge portion and the second cutting edge portion have substantially the same length to provide a substantially equal cutting depth along each of two orthogonal cutting directions; and
   as seen along the center axis, a first angle ($\beta$) within a range of 14+/−9 degrees formed between a first imaginary line extending from the center axis to one of the corner points at the first side surface and a second imaginary line extending from the center axis to an adjacent corner point of the corner points at the second side surface.

2. The cutting tool insert according to claim 1, further comprising a ratio of within a range of 0.7:1 to 1.1:1 between a distance extending between the first and second side surfaces along the center axis and a distance extending between two adjacent corner points of the first side surface.

3. The cutting tool insert according to claim 1, wherein the first cutting edge portion and the second cutting edge portion each are arranged to provide a cutting depth of at least 4 mm along each of two orthogonal cutting directions.

4. The cutting tool insert according to claim 1, wherein the body includes a through hole extending along the center axis.

5. The cutting tool insert according to claim 1, wherein seen in a side view along the center axis a second angle ($\gamma$) within a range of 5 to 20 degrees is formed between a third imaginary line extending from a first corner point to an adjacent second corner point at the first side surface and a relief face of a second cutting edge portion related to the first corner point.

6. The cutting tool insert according to claim 5, wherein as seen in a side view along the center axis a third angle ($\delta$) having a size within a range of a size of the second angle ($\gamma$) +0 to +10 degrees is formed between the third imaginary line and a fourth imaginary line extending along a tip portion of the first cutting edge portion at the adjacent second corner point.

7. The cutting tool insert according to claim 5, wherein the relief face of the second cutting edge portion is to form a first abutment surface for transferring at least part of a tangential cutting force from an adjacent engaging cutting edge to a supporting surface of a relevant cutting tool insert holder.

8. The cutting tool insert according to claim 7, comprising a substantially concave surface portion extending substantially in parallel with the center axis and from the relief face of the second cutting edge portion towards an adjacent cutting edge, and wherein at least a portion of the substantially concave surface forms a second abutment surface for transferring at least part of a cutting force from an opposite cutting edge to a supporting surface of a relevant cutting tool insert holder.

9. The cutting tool insert according to claim 1, wherein a transition between one of the second cutting edge portions at the first side surface and an adjacent of the second cutting edge portions at the second side surface is formed by a continuous interconnecting edge extending between said two second cutting edge portion.

10. The cutting tool insert according to claim 9, wherein the continuous interconnecting edge crosses the imaginary middle plane at an angle other than a right angle.

11. The cutting tool insert according to claim 10, wherein an imaginary further plane extends along the center axis and at a right angle to a relief face of said one of the second cutting edge portions at the first side surface, wherein seen along the imaginary further plane the continuous interconnecting edge extends away from the imaginary further plane, and wherein seen in parallel with the imaginary further plane the continuous edge extends towards the center axis.

12. The cutting tool insert according to claim 1, comprising a ridge (44) forming a first chip breaker at the first cutting edge portion (16) and a second chip breaker at the second cutting edge portion (18), wherein the ridge (44) extends substantially along a bisector of the corner angle ($\alpha$).

13. The cutting tool insert according to claim 12, wherein the substantially concave surface extends at least along a portion of the ridge.

14. The cutting tool insert according to claim 1, wherein the cutting tool insert is a turning tool insert.

15. A cutting tool insert holder comprising:
a cutting tool body having a recess;
a shim arranged at a bottom portion of the recess; and
a clamping device for clamping a cutting tool insert in the recess against the shim, the cutting tool insert including a body having a first side surface, a second side surface extending in parallel with and being substantially identical to the first side surface, and four mutually substantially identical lateral surfaces extending between the first and second side surfaces; eight separate cutting edges, the separate cutting edges being identical and each separate cutting edge including a first cutting edge portion and a second cutting edge portion interconnected together by a corner edge, wherein the first cutting edge portion extends along a rim portion at an intersection between one of the first and second side surfaces and one of the lateral surfaces and the second cutting edge portion extends along a rim portion at an intersection between two of the lateral surfaces along a direction from the corner edge towards an imaginary middle plane extending between and in parallel with the first and second side surfaces; a plurality of corner points, a corner point being at each of the corner edges as seen in a side view along a center axis of the insert extending perpendicularly to the first and second side surfaces, four of the corner points being symmetrically arranged at each of the first side surface and the second side surface with equal diagonal distances between the corner points; a corner angle ($\alpha$) between the first cutting edge portion and the second cutting edge portion being within a range of 75 to <90 degrees, wherein the first cutting edge portion and the second cutting edge portion have substantially the same length to provide a substantially equal cutting depth along each of two orthogonal cutting directions; and as seen along the center axis, a first angle ($\beta$) within a range of 14+/−9 degrees formed between a first imaginary line extending from the center axis to one of the corner points at the first side surface and a second imaginary line extending from the center axis to an adjacent corner point of the corner points at the second side surface.

* * * * *